Sept. 4, 1962 L. FOX 3,052,414
MIXING VALVES
Filed Dec. 28, 1959 2 Sheets-Sheet 1

LESLIE FOX
INVENTOR

BY Mason, Porter, Miller & Stewart
ATTORNEYS

Sept. 4, 1962 — L. FOX — 3,052,414
MIXING VALVES
Filed Dec. 28, 1959 — 2 Sheets-Sheet 2

LESLIE FOX
INVENTOR
BY Mason, Porter, Diller & Stewart
ATTORNEYS

United States Patent Office 3,052,414
Patented Sept. 4, 1962

3,052,414
MIXING VALVES
Leslie Fox, 62 Monk Lance Ave., Tynemouth, England
Filed Dec. 28, 1959, Ser. No. 862,204
6 Claims. (Cl. 236—12)

This invention relates to improvements in mixing valves for use with hot water heating systems and having an inlet port connected to a boiler, an outlet port through which water passes to the heating circuit, a second inlet port connected with the return pipe from the heating circuit and an inlet port controlling member which is moved in one direction to increase the flow through one inlet port and decrease the flow through the other inlet port and vice versa. By adjusting the position of the inlet port controlling member more or less of the water returning from the heating circuit can be mixed with the water from the boiler to maintain the flow to the heating circuit at a selected temperature which can be varied within wide limits up to the maximum temperature of the boiler water. The inlet port controlling member is connected by a bi-metal coil to a setting finger or dial which is set to the required temperature for the flow to the heating circuit and the bi-metal coil will then automatically adjust the position of the inlet port controlling member as and when required to keep the temperature of the flow to the heating circuit to that selected. The object of the present invention is to provide a mixing valve of the kind referred to above which is adapted to feed two separate heating circuits or either one or the other of the heating circuits so that either circuit can be put out of operation when desired.

According to this invention the mixing valve is provided with an inlet port which is connected to the boiler, a second inlet port which is connected to the return pipe from a circulating pump to the boiler, a thermostatically controlled double headed valve between the two inlet ports, two separate outlet ports and a rotatable valve which is turned to open both outlet ports or close either one outlet port or the other outlet port. The rotatable valve may be turned manually for the selective opening and closing of the ports or it may be turned step by step by a solenoid which is energized when it is required to adjusted the valve. The solenoid may be energized by the closure of a switch controlled by a time clock which is set to close the switch at predetermined times.

The invention will now be more particularly described with reference to the accompanying drawings in which.

Like letters indicate like parts throughout the drawings.

Figure 1:
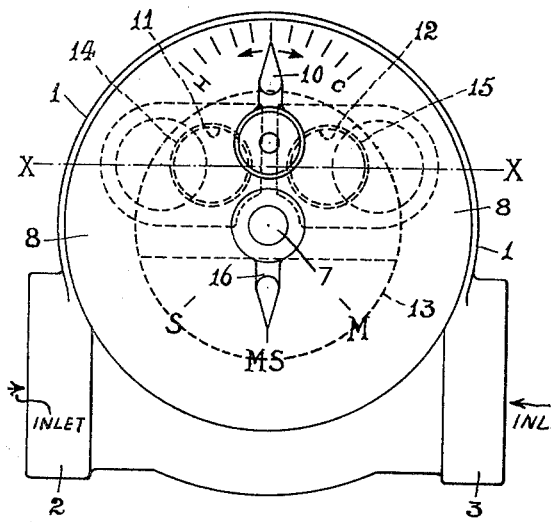
FIG. 1 is a front elevation of a mixing valve constructed according to this invention.
Figure 2:
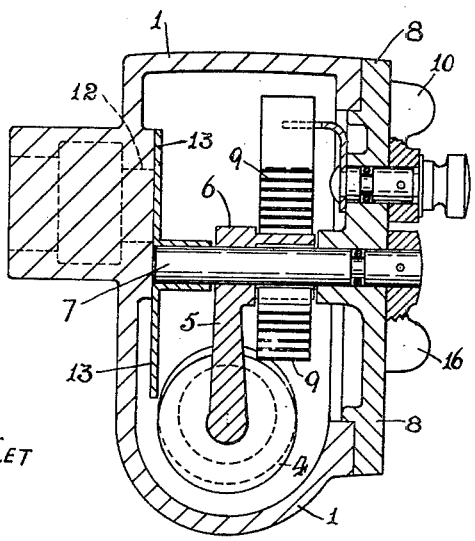
FIG. 2 is a sectional side elevation.

In carrying out this invention as shown in FIGS. 1 to 4 the valve casing 1 is formed with an inlet port 2 connected to the boiler and a second inlet port 3 connected with the return pipe from a circulating pump provided for circulating the water through the heating circuits. The two inlet ports 2, 3 are disposed co-axial with each other and on opposite sides of the valve casing 1. The flow through the inlet ports is controlled by a member 4 which is movable across between the inlet ports to control the flow therethrough. As the flow through one inlet port is decreased that through the other is increased and vice versa. The flow controlling member 4 is carried by an arm 5 on a sleeve 6 freely mounted on an axle 7 carried in a bearing provided in a cover plate 8 on the front of the casing 1. The sleeve 6 is connected to the inner end of a bi-metal coil 9 the other end of which is connected in any convenient manner to a setting finger 10 or dial mounted on the exterior of the cover plate 8 so that the flow controlling member 4 can be set according to the temperature required for the flow to the heating circuits and when set its position will be automatically adjusted by the bi-metal coil 9 to maintain that temperature.

Figure 3:
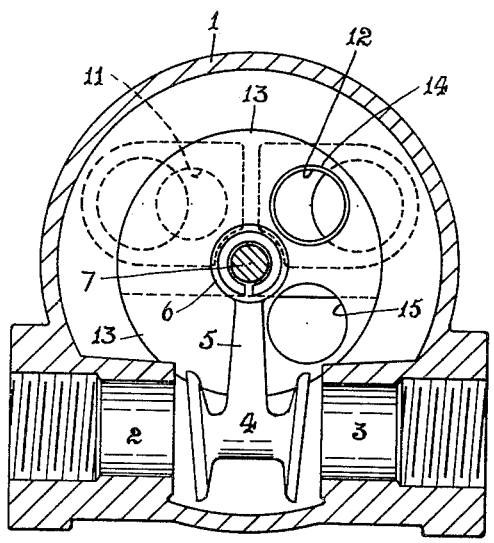
FIG. 3 is a sectional front elevation and FIG. 4 is a sectional plan on the line XX of FIG 1.
Figure 4:
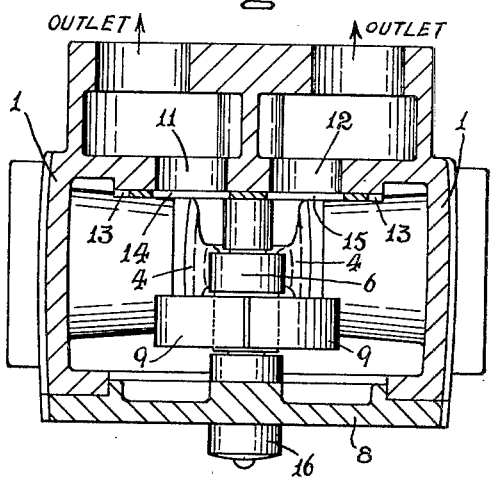

Two outlet ports 11, 12 are provided in the casing 1 and these are connected to separate heating circuits. The outlet ports 11, 12 may conveniently be disposed in the back of the casing. Associated with the outlet ports 11, 12 is a disc 13 which is provided with two openings 14, 15 therein which register with the outlet ports 11, 12 when the disc 13 is in a certain position as indicated in broken lines in FIG. 1. The disc 13 is made movable between limits and is arranged so that when turned to the limit in one direction one outlet port 11 is closed as shown in FIG. 3, when turned to the limit in the other direction the other outlet port 12 is closed and when mid-way between the limits as shown in FIG. 1 both outlet ports are open. To provide for the adjustment of the disc 13 it may conveniently be secured to the axle 7, previously mentioned, which carries the flow controlling member 4. The axle 7 extends through the cover plate 8 and a lever 16 is provided on the outer end of the axle 7 to adjust the position of the disc 13.

When the lever 16 is in the position shown in FIG. 1 both the ports 11, 12 are open. When the lever is moved to the position M, the port 11 is open and when the lever is moved to the position S, the port 12 is open, the disc 13 then being in the position shown in FIG. 3.

A mixing valve constructed as described provides automatic temperature control of the flow to two separate heating circuits with provision for cutting out either of the heating circuits when not required.

Figure 5:
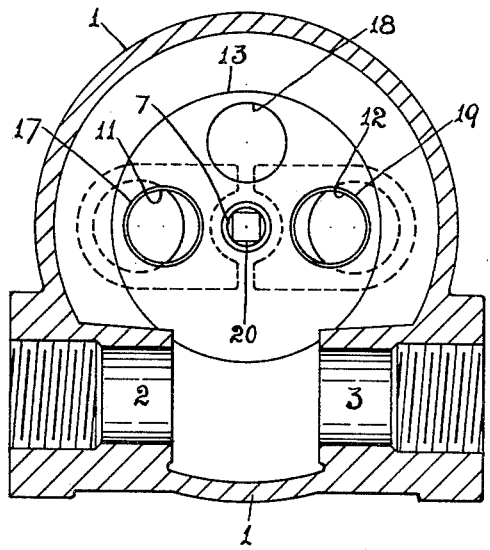
FIG. 5 is a sectional front elevation.
Figure 6:
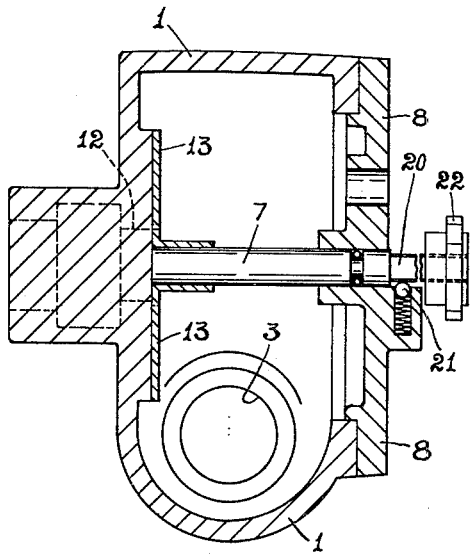
FIG. 6 is a sectional side elevation of an alternative form of construction with the thermostatically controlled valve omitted from the drawings.
Figure 7:
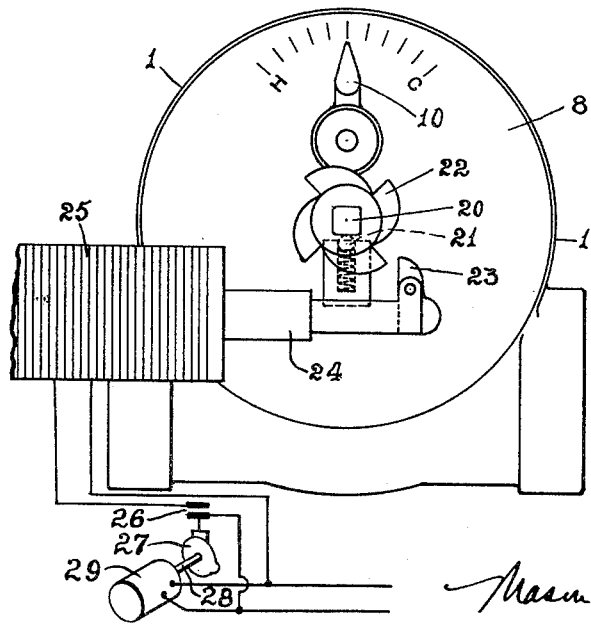
FIG. 7 is a front elevation showing one method of adjusting the rotary valve by means of a solenoid.

In an alternative construction shown in FIGS. 5 to 7 provision is made for the automatic adjustment of the disc 13 to provide four successive positions. In the first position both outlet ports 11, 12 are open. In the second position only the outlet port 12 is open. In the third position both outlet ports are again open and in the fourth position only the outlet port 11 is open.

For this purpose the disc 13 is provided with three openings 17, 18, 19 arranged as shown in FIG. 5. As shown in FIG. 5, the openings 17 and 19 register with the outlet ports 11, 12 respectively and both ports are open. If the disc 13 is turned through ninety degrees in a clockwise direction the opening 18 will move to register with the outlet port 12 and the outlet port 11 will be closed by the disc 13. On turning the disc 13 through a further ninety degrees both ports will again be opened. When turned a further ninety degrees the opening 18 will register with the outlet port 11 and the outlet port 12 will be closed. On turning the disc 13 through a further ninety degrees it will be returned to its initial position.

The disc 13 is secured on the axle 7 as in the previously described example and in order to correctly locate the axle 7 with the disc 13 in each of its four positions, the axle 7 is provided with a square part 20 thereon and a spring pressed plunger or ball 21 is provided to engage with the flat surface of the square part 20.

In order to turn the axle 7 to move the disc 13 into its four positions in succession a ratchet wheel 22 is secured on the shaft 7. Associated with the ratchet wheel 22 is a pawl 23 mounted on the armature 24 of a solenoid 25. The solenoid is adapted when energized to move the armature 24 a sufficient distance for the pawl 23 to turn the ratchet wheel through ninety degrees. The pawl 23 is pivoted to the armature 24 and is either counterweighted or provided with a light spring to permit of its return to the position shown in FIG. 7 when the solenoid is de-energized. The armature 24 is moved by the solenoid against the action of a light spring which returns the armature to its initial position when the solenoid is de-energized. The solenoid 25 is energized by the closure of a switch 26 and this switch may conveniently be closed at predetermined times by a cam 27 carried by and driven from an armature shaft 28 of an electric motor 29. The electric motor 29, if desired, may be provided with a suitable reduction gearing (not shown) which may be of the clock train type, so that adjustment of the disc 13 is carried out at pre-set times.

The arrangement is very suitable for use with a central heating system for a house where one outlet port from the mixing valve is connected with a heating circuit on the ground floor and the other outlet port connected to a heating circuit on an upper or upper floors and providing two independent heating circuits. An electrically operated circulating pump is normally provided to circulate the water and permit of the use of small bore pipes and by a suitable setting of the time clock the circulating pump can be started at 6.0 a.m. and both heating circuits supplied. At say 10.0 a.m. the upper floor circuit is cut out by adjusting the disc 13, the ground floor circuit remaining in operation. At say 8.0 p.m. the mixing valve is again adjusted and the upper floor circuit brought into operation. At say 10.0 p.m. the mixing valve is again adjusted and the ground floor circuit cut off. At say midnight the circulating pump is stopped and the system shut down and remains shut down until re-started again next morning at 6.0 a.m. when the mixing valve will be again adjusted so that both circuits are supplied.

The arrangement described is very convenient because it operates automatically and it also allows considerable saving in fuel with consequent economy and because it enables the boiler capacity to be fully utilized, a small boiler can be used in many cases.

What I claim is:

1. A mixing valve comprising in combination a substantially cylindrical casing including a front and a back, a first inlet port in one side of the casing, a second inlet port in the opposite side of the casing and coaxial with the first inlet port, an axle extending generally normal to the axes of the inlet ports and through the front of the casing, an arm loosely mounted on the axle, a double headed valve carried by the arm between the two inlet ports for controlling the flow through the inlet ports, a bimetallic coil connected to the arm, a coil setting finger on the front of the casing and having an extension projecting into the casing and connected to the coil for setting the coil, two outlet ports in the back of the casing, a disc secured on the axle and extending over the outlet ports, openings in the disc for registration with the outlet ports, and means to turn the axle to bring the openings into selected registry with the outlet ports whereby flow may be through either one of the outlet ports or both of the outlet ports.

2. A mixing valve comprising in combination a substantially cylindrical casing having a front and a back, two oppositely disposed inlet ports with one being disposed on each side of the casing, an axle extending through the front of the casing into the interior thereof, an arm loosely mounted on the axle, a double headed valve in the casing between the inlet ports and carried by the arm, a coil setting finger on the front of the casing and having a portion projecting into the interior of the casing, a bimetallic coil connected by the arm and the setting finger, two outlet ports in the rear of the casing, a disc secured on the axle, said disc extending over the outlet ports and having three openings moveable into registration with the outlet ports by rotating the axle, means to rotate the axle to bring the openings in the disc into registry with the outlet ports to selectively open both outlet ports or one or the other of the outlet ports, and means to retain the axle in a pre-set position.

3. A mixing valve according to claim 2 in which the means to turn the axle includes a ratchet wheel secured on the axle outwardly of the casing, electrically operated solenoid, a pawl on the solenoid to engage the teeth of the ratchet wheel, and means to excite the solenoid at pre-set times to turn the axle and change the position of the disc.

4. A mixing valve comprising in combination a substantially cylindrical casing having a front and a back, a first inlet port in one side of the casing, a second inlet port in the opposite side of the casing and coaxial with the first inlet port, a horizontally disposed axle extending through the front of the casing and projecting into the casing, a depending arm loosely mounted on the axle and being gravitationally urged to a lowermost position, a double headed valve carried by the lower end of the arm and disposed between the two inlet ports for controlling flow therethrough, a bimetallic coil connected to the arm, a coil setting finger on the front of the casing and having an extension projecting into the casing and connected to the coil for setting the coil, two outlet ports in the back of the casing, a disc secured on the axle and extending over the inlet ports, openings in the disc for registration with the outlet ports, and means to turn the axle to bring the openings into selected registry with the outlet ports whereby flow may be through either one of the outlet ports or both of the outlet ports.

5. For use in a hot water heating system of the type including a heating water supply line, a heating water return line, and two separate heating circuits, a combined mixing and flow control valve comprising in combination a substantially cylindrical casing including a front and a back, a first inlet port in one side of said casing and adapted to be connected to the heating water supply line, a second inlet port in the opposite side of said casing and adapted to be connected to the heating water return line, said inlet ports being coaxial, two outlet ports in the back of said casing and adapted to be connected to the two separate heating circuits, an axle extending generally normal to the axes of the inlet ports and through the front of the casing, an arm loosely mounted on the axle, a double headed valve carried by the arm between the two inlet ports for controlling the flow through the inlet ports, a bimetallic coil connected to the arm, a coil setting finger on the front of the casing and having an extension projecting into the casing and connected to the coil for setting the coil, a disc secured on the axle and extending over the outlet ports, openings in the disc for registration with the outlet ports, and means to turn the axle to bring the openings into selected registry with the outlet ports whereby flow may be through either one of the outlet ports or both of the outlet ports.

6. A mixing valve according to claim 5 in which the means to turn the axle includes a ratchet wheel secured on the axle outwardly of the casing, electrically operated solenoid, a pawl on the solenoid to engage the teeth of the ratchet wheel, and means to excite the solenoid at pre-set times to turn the axle and change the position of the disc to thereby facilitate control of water flow in the two separate heating circuits.

References Cited in the file of this patent

UNITED STATES PATENTS

| | | |
|---|---|---|
| 1,961,386 | Payne | June 5, 1934 |
| 2,287,294 | Coile et al. | June 23, 1942 |
| 2,563,955 | Pearse | Aug. 14, 1951 |
| 2,636,560 | Rogers | Apr. 28, 1953 |
| 2,832,561 | Holl | Apr. 29, 1958 |
| 2,908,293 | Johnson | Oct. 13, 1959 |